United States Patent
Ottoni, Benedicto et al.

(10) Patent No.: US 12,398,526 B2
(45) Date of Patent: Aug. 26, 2025

(54) HYDROKINETIC CHAMBER AND CHAMBER FOR GENERATING HYDROKINETIC ENERGY PERTAINING TO THE ENERGY-GENERATING MODULE OF A FLOATING HYDROELECTRIC POWER PLANT

(71) Applicant: THEOPHILO OTTONI—ESTUDOS, PROJETOS E TECNOLOGIA EM RECURSOS HÍDRICOS LTDA., Rio de Janeiro (BR)

(72) Inventors: Arthur Ottoni, Benedicto, Rio de Janeiro (BR); Theophilo Ottoni Filho, Benedicto, Rio de Janeiro (BR)

(73) Assignee: THEOPHILO OTTONI—ESTUDOS, DE PROJETOS E TECNOLOGIA EM RECURSOS HIDRICOS LTDA., Rio de Janeiro (BR)

( * ) Notice: Subject to any disclaimer, the term of this patent is extended or adjusted under 35 U.S.C. 154(b) by 0 days.

(21) Appl. No.: 18/294,120

(22) PCT Filed: Aug. 3, 2022

(86) PCT No.: PCT/BR2022/050305
§ 371 (c)(1),
(2) Date: Jan. 31, 2024

(87) PCT Pub. No.: WO2023/010193
PCT Pub. Date: Feb. 9, 2023

(65) Prior Publication Data
US 2024/0352697 A1 Oct. 24, 2024

(30) Foreign Application Priority Data
Aug. 5, 2021 (BR) .......................... 1020210155108

(51) Int. Cl.
*E02B 9/00* (2006.01)
*F03B 13/08* (2006.01)

(52) U.S. Cl.
CPC ................ *E02B 9/00* (2013.01); *F03B 13/08* (2013.01)

(58) Field of Classification Search
None
See application file for complete search history.

(56) References Cited

U.S. PATENT DOCUMENTS

| | | | | | |
|---|---|---|---|---|---|
| 4,165,467 | A | * | 8/1979 | Atencio | F03B 13/08 405/75 |
| 7,478,974 | B1 | | 1/2009 | Lowell | |
| 2010/0260596 | A1 | * | 10/2010 | Gokhman | F03B 13/086 290/53 |

FOREIGN PATENT DOCUMENTS

| | | |
|---|---|---|
| BR | 9001124 A | 3/1991 |
| BR | 0301109 A | 8/2005 |

(Continued)

OTHER PUBLICATIONS

SU-1386735-A1 + machine translation (Year: 1986).*
International Search Report, mailed Nov. 23, 2022, from PCT/BR2022/050305, 9 pages.

*Primary Examiner* — Juan G Flores
(74) *Attorney, Agent, or Firm* — Workman Nydegger

(57) ABSTRACT

The present invention relates to the hydrokinetic chamber (22) comprising the propeller/vanes of the hydrokinetic turbine (23), the water collector (21) of the hydrokinetic chamber, a leak channel (26) of the hydrokinetic chamber, a flow control gate (28) for controlling the flow into the hydrokinetic chamber, and stop-logs (27) for the maintenance of the hydrokinetic chamber, the hydrokinetic chamber being associated with a chamber (24) for generating hydrokinetic energy, which houses a turbine-generator (23)

(Continued)

CROSS-SECTION A-A and motor pumps, the chambers (22) and (24) being mounted in an energy-generating module for generating hybrid energy. The invention also relates to a method for generating energy and to a floating Hydroelectric Power Plant using the components of the present invention.

10 Claims, 7 Drawing Sheets

(56) References Cited

FOREIGN PATENT DOCUMENTS

| | | | |
|---|---|---|---|
| BR | 112012010871 | A2 | 2/2021 |
| KR | 20090053063 | A | 5/2009 |
| WO | WO-2007139486 | A1 * | 12/2007 |

* cited by examiner

CROSS-SECTION A-A

PLANT

CROSS-SECTION A-A

PLANT

CROSS-SECTION A-A

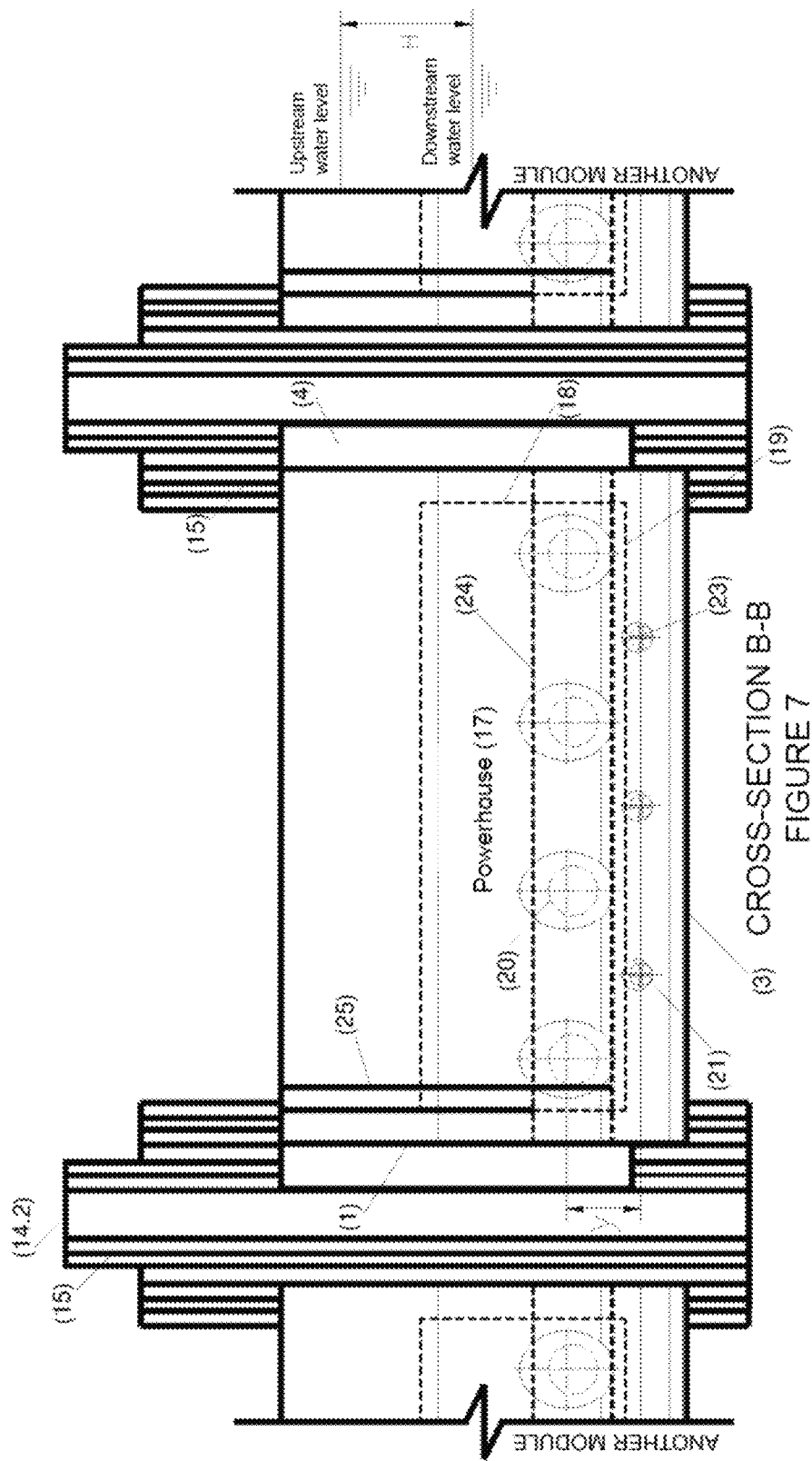

HYDROKINETIC CHAMBER AND CHAMBER FOR GENERATING HYDROKINETIC ENERGY PERTAINING TO THE ENERGY-GENERATING MODULE OF A FLOATING HYDROELECTRIC POWER PLANT

I. FIELD OF THE INVENTION

The present invention relates to hydroelectric power generation plants using pressure (head), without flow regulation, in hydroelectric complexes with either short heads using a Floating Hydroelectric Power Plant (FHPP), or long heads using a string of FHPPs, the invention addresses the optimization of the Energy-Generating Module (EGM) through adding a "synergetic" effect with "simultaneous action", to overall hydroelectric power generation at the Plant whereby, in addition to the head (energy generation through pressure), through the flow velocity in the penstocks section of the FHPP, hydrokinetic energy generation is also introduced, thus upgrading the application of the Floating Hydroelectric Power Plant (FHPP).

II. DESCRIPTION OF THE RELATED STATE OF THE ART

Conventional riverine Hydroelectric Power Plants (HPP) (like the Itaipu and Tucuruí hydroelectric complexes, among others) use a water level difference (H-Head) that is usually created by damming the watercourse completely. These plants are comprised of water intakes, powerhouses, spillways and stilling basins, which are permanent structures built on or alongside riverbeds, depending on the hydraulic array. Together with the actual dams, they make hydropower generation possible. At medium and large-scale hydroelectric complexes, water storage reservoirs are usually established for conventional hydroelectric facilities.

These types of hydroelectric power generation plants are usually costly, with more complex hydraulic arrays, and loan construction times. Furthermore, the need to establish reservoirs at conventional plants curtails the choice of appropriate locations for building them, due to environmental issues, with this constraint being more stringent in watersheds with flat topography.

Moreover, even at locations where large reservoirs can be built, their construction causes massive negative environmental impacts and ecological imbalance in watersheds.

Widely used worldwide, conventional hydropower generation based on head/pressure relies on a combination of head and induced flow to generate hydraulic power. Subsequently, electrical power is produced through the activation of a turbine and an electricity generator.

The many varieties of renewable energy sources (wind; solar/photovoltaic) include hydrokinetic energy. This is based on the mechanical conversion of the kinetic energy of moving water in rivers, canals, estuarine tides, or ocean currents. In rivers, the velocity of the current lines drives the movements of the rotors, which will convert the hydraulic energy of the water flow into mechanical energy in the turbine. This is then converted into electrical energy in the electricity generators. This type of power generation is called hydrokinetic generation. In this type of generation, unlike conventional hydropower generation (by pressure/head), there is no need for massive civil construction projects such as dams, spillways, etc., thus significantly lowering costs and lessening negative environmental effects.

Many studies examine the hydrokinetic potential of rivers. This potential is present downstream from operating hydropower plants (making good use of the remaining potential power); in rivers on rural properties, thus contributing to rural electrification; in large rivers in Amazonia with massive flows and ample space for turbine facilities. It may also be used to supply energy to riverine and isolated communities in that region, among others.

Just as there is significant potential for this generation source, there are also many challenges and uncertainties for the maturation of this technology. They include identifying suitable locations in rivers with net flow velocities that are suitable for setting up a hydrokinetic energy generation park; developing more efficient hydrokinetic turbines; defining a prospecting methodology for natural hydrokinetic potential with velocities fast enough to drive the turbine; studying hydrokinetic systems, which contain many electrical and mechanical elements, and establishing an industrial facility producing components for a hydrokinetic park.

As described at the state of the art, one type of energy generation system uses a floating energy generator unit through pressure/head, as described in the PI 0301109-7 document, which discloses a floating unit with a special shape, containing a convergent-divergent inner channel to increase the natural energy of the incoming water flow. Hydraulic energy (induced flow) is transformed through pressure (drop/head H) into mechanical energy by a hydraulic turbine with special vanes (bulb turbine), which is then transmitted to an electricity generator.

The Floating Hydroelectric Power Plant (FHPP) addressed by this invention contains no large structures, such as a main dam, water intake, powerhouse, spillway, and stilling basin, supported on the riverbed, and damming the water flow. Overall, the hydroelectric power generation of an FHPP is a function (i) of the upstream-downstream water level difference H along the plant section and induced flow, as addressed in PI 0301109-7 (pressure/head energy generation), and (ii) flow velocities in the penstocks section of the Plant, as proposed in the present invention (hydrokinetic energy generation). The layout addressed by this invention thus includes and optimization of the overall electric power generated by the FHPP, meaning hydroelectric power generated through pressure (as encompassed previously at the state of the art), as well as hydroelectric power generated through flow speed, with the negative environmental effects inherent to the construction and operation phases of an FHPP being minimal or negligible.

In order to minimize the economic and environmental problems associated with the construction of reservoirs such as those used by conventional hydroelectric power plants, the inventor of this invention consequently developed a novel hydropower generation system, that is designed and built in modules. It operates more efficiently for generating hydroelectricity, optimizing the overall hydropower generation of the plant by using the same water level difference (drop/head H), to generate pressure energy (from the pressure/head) in the penstocks section of the Plant, and hydrokinetic energy (from the flow velocity). These types of hydroelectric power generation are performed together at the same time (through "hybrid" hydropower generation using pressure and hydrokinetic/velocity), especially during the rainy season (medium and high water levels), when an overflow ("spill") runs into the river in the penstocks section of an FHPP. During the dry season (medium to low water levels), pressure/head energy generation prevails, with the type of hydroelectric power generation at the FHPP developed by this invention occurring in regions with flat topography and no natural waterfalls, through the use of floating energy modules, with no technological equivalents.

III. SUMMARY OF THE INVENTION

The present invention comprises a hydrokinetic chamber 22, that comprises a circular cross section that provides maximum hydraulic efficiency, whose diameter is compatible with that of the propeller/vanes of the hydrokinetic turbine 23, with the said hydrokinetic chamber 22 located in the Energy-Generating Module EGM and altimetrically located on the bottom thereof, close to the bottom wall of the EGM 3, occupying the entire longitudinal length of the EGM, and planimetrically using the space between 1 (one) pair of pressure/head hydropower generation components, being comprised of the powerhouse 17 and the bulb turbine 20, comprising the chamber 22 of the water collector 21 of the hydrokinetic chamber, located in and altimetrically positioned on the bottom 3 of the EGM, on the upstream side of this EGM; a leak channel 26 of the hydrokinetic chamber, located on the bottom and on the downstream side of the EGM; a flow control gate of the hydrokinetic chamber 28, close to/upstream from the hydrokinetic energy generation chamber 24; and stop-logs 27 for the maintenance of the hydrokinetic chamber 27, which are located at the start (upstream) and end (downstream) of the chamber 22.

Based on the hydrokinetic chamber 22, as defined above, the present invention defines an energy generation method wherein the said chamber 22 channels the flows and transmits the water flow velocities (QTHC) contained in the chamber through the water collector 21 to the vanes-propellers of the hydrokinetic generator turbine 23, submersed in the water collector 22, which transforms hydraulic energy, kinetic energy, into mechanical energy through the torque and rotation velocity of the propellers/vanes 23, which is sent to a rotor coupled to the energy generator (not shown) to generate electric power in the hydrokinetic energy generation chamber 24, with the flow velocity in the hydrokinetic chamber 22 being a direct function of the project drop/head H.

Another embodiment of this invention is a hydrokinetic energy generation chamber 24, which is located planimetrically about halfway along the length of an Energy-Generating Module (EGM) and upstream from the cross-walls of the powerhouse 18 of the pressure power generation facility, and altimetrically immediately above the hydrokinetic chamber 22, to the bottom of the EGM, with the dimensions of the hydrokinetic energy generation chamber 24 being compatibly large enough to accommodate the turbine-generator 23, the motor-pumps (not shown), and the flow control gate of the hydrokinetic chamber 28, as well as the equipment and space needed to perform repairs and maintenance thereon. This hydrokinetic energy generation chamber 24 occupies the entire cross-width of the EGM, with the chamber 24 supported by the two side-walls of the EGM 1.

Another embodiment of the hydrokinetic energy generation chamber 24 addressed by this invention is related to the fact that it has an access elevator 25 leading to the hydrokinetic energy generation chamber, which is located at one end of the EGM and planimetrically connected to the hydrokinetic energy generation chamber 24, whereby this elevator 25 EGM surface to the hydrokinetic energy generation chamber 24 area, with the latter located close to the hydrokinetic chamber 22 and the bottom 3 of the EGM.

An energy generation method is also presented, through the hydrokinetic energy generation chamber 24 wherein the hydrokinetic energy of the EGM is generated by the propellers/vanes of the turbine 23, which are submersed in the hydrokinetic chamber 22, connected to the generator by the turbine rotor, which is a generator located in the hydrokinetic energy generation chamber 24.

The invention consequently presents an energy generation method that comprises the association of the hydrokinetic chamber 22 with the hydrokinetic energy generation chamber 24.

The associated structures are assembled, and the Energy-Generating Module EGM, for hydrokinetic energy generation, comprises the combination of the hydrokinetic chamber 22 with the hydrokinetic energy generation chamber 24, as well as hydroelectric power generation through head/pressure, which is performed by the EGM through the bulb turbine 20, constituting "hybrid" hydroelectric power generation in the EGM.

Finally, the invention defines a Floating Hydroelectric Power Plant (FHPP)—in its penstocks section, which comprises at least one hydrokinetic chamber 22, at least one hydrokinetic energy generation chamber 24, at least one Energy-Generating Module, or a combination thereof in the penstocks section.

The present invention corresponds to a technological improvement described in Brazilian Patent PI 0301109-7, entitled: "Guide System, Floating Hydroelectric Power Plant and Operating Procedure For Floating Hydroelectric Power Plant", and adds functional and technological details to the Application, resulting from technological research that upgraded the previous system.

The Energy-Generating Module (EGM) of an FHPP (Floating Hydro Power Plant) has been described in detail, in terms of its physical and hydrodynamic structures, having been upgraded through the elements described below, striving to generate hydrokinetic energy as well, and thus enhancing the overall energy generation efficiency of the plant, in addition to the pressure-based energy anticipated in the prior art.

The configurations of the guide-support system and vertical displacement of the generation modules between the pillars (FIGS. 5 and 6 in the prior art) are retained, together with the ballast water variation operating system for the generation modules, as already encompassed by the state of the art.

IV. BRIEF DESCRIPTION OF THE DRAWINGS

FIG. 7 shows a cross-section view BB of FIG. 5

Figure 5:
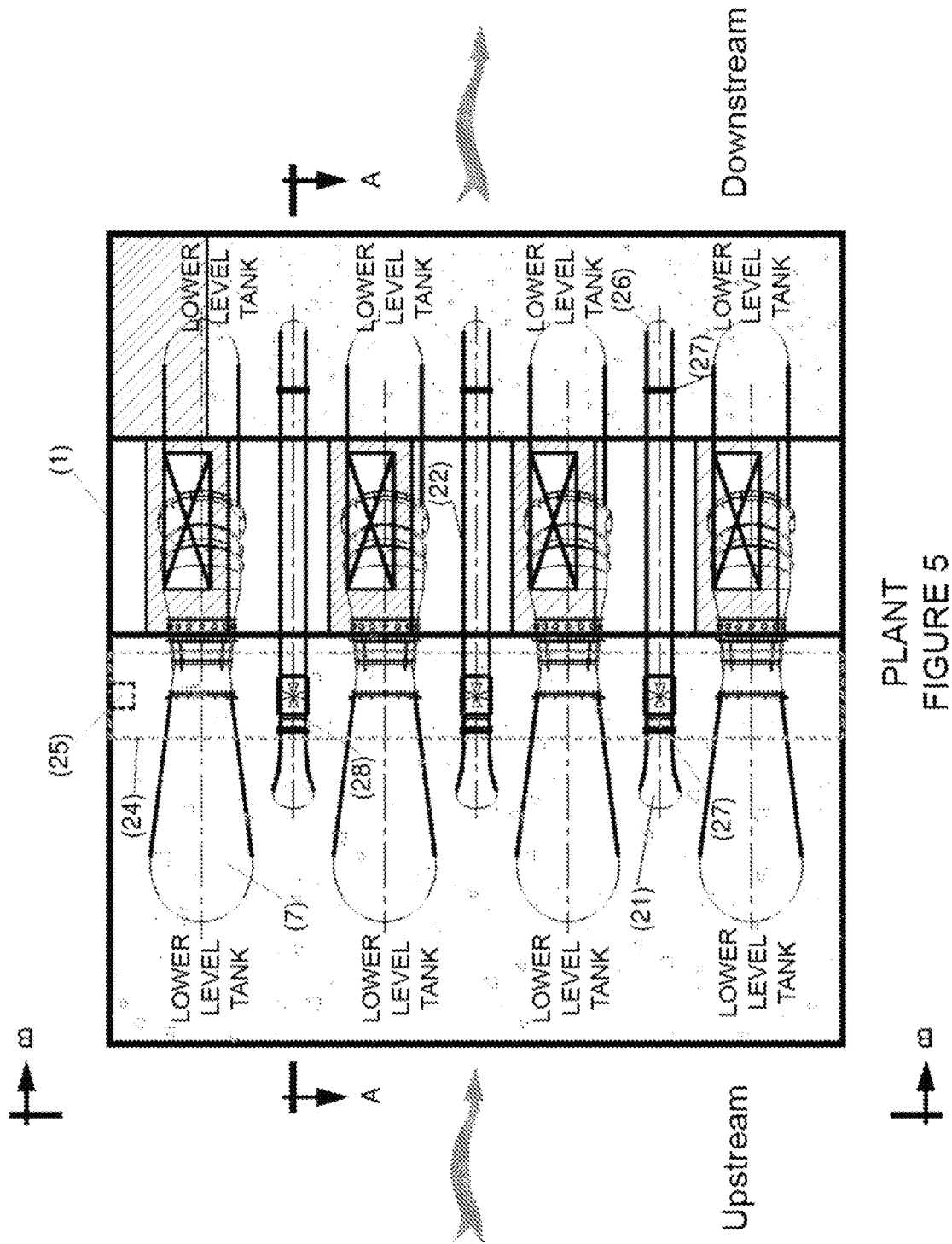
FIG. 5 shows an optimized floorplan of the Energy-Generating Module with the hydrokinetic energy generation elements.
Figure 6:
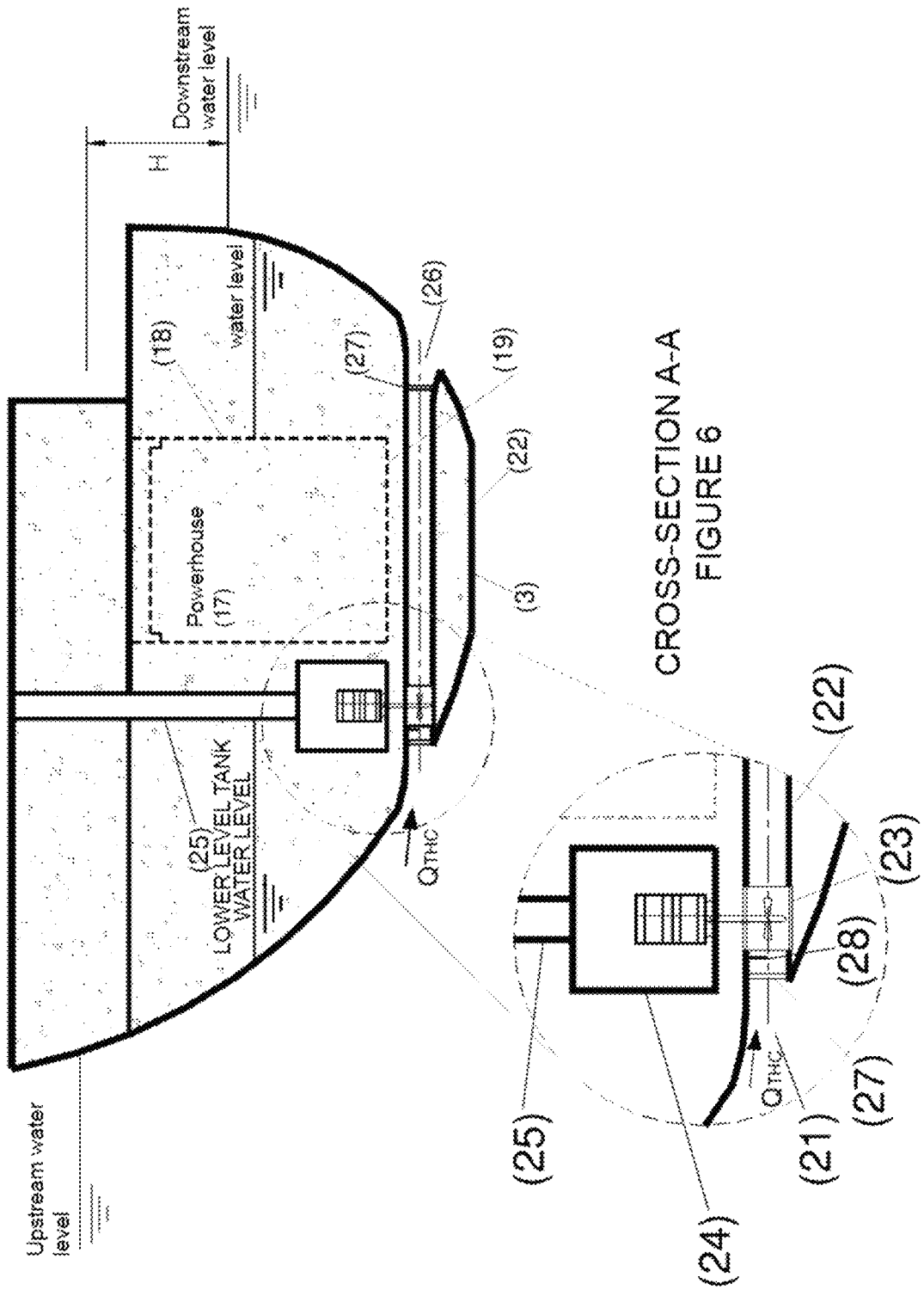
FIG. 6 shows a cross-section view AA of FIG. 5.

FIGS. 1 to 4 present configurations for an FHPP and the Energy-Generating Module (EGM) according to the prior art; while FIGS. 5 to 7 show the composition of an FHPP with the enhancement elements proposed by this invention, especially for the Energy-Generating Module (EGM).

Figure 1:
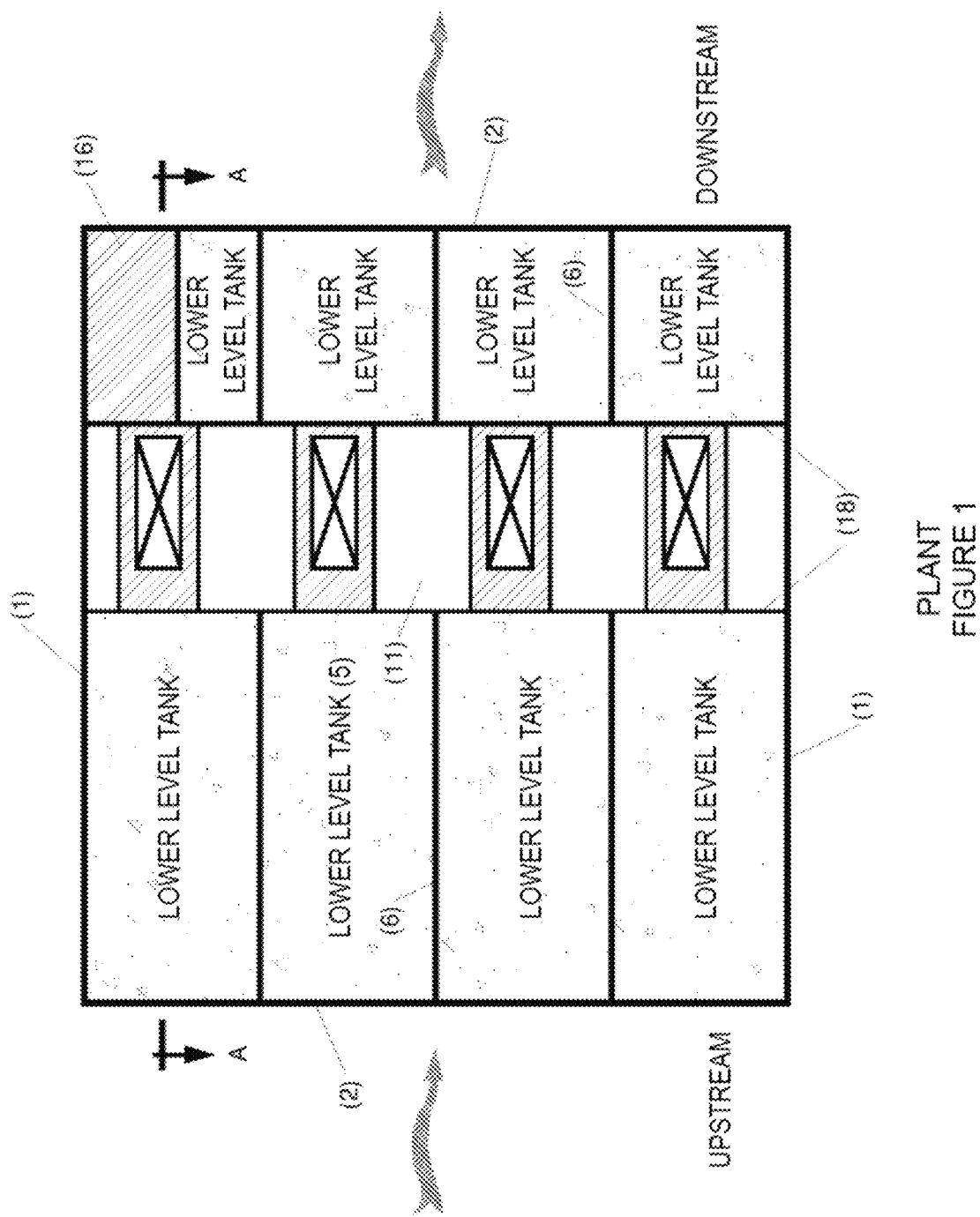
FIG. 1 shows the floorplan of the Energy-Generating Module.

V—LIST OF ELEMENTS MENTIONED IN THE FIGURES 1 side-walls of the EGM
2 cross-walls of the EGM 3 bottom wall of the EGM
4 buttresses supporting the EGM
5 lower level tanks of the EGM
6 side-walls of the lower level tanks
7 penstocks
8 openings in the bottom wall of the EGM
9 support apron of the EGM
10 recess in the side-walls of the EGM
11 powerhouse roof
12 overhead cranes
13 longitudinal pillars of the FHPP
14 guide devices system (details)
14.2 coping on the longitudinal pillar
15 grooves in the longitudinal pillar
16 access slab for the EGM
17 powerhouse
18 cross-walls of the powerhouse
19 floor of the powerhouse
20 hydroelectric generation equipment through pressure-Bulb turbine
21 water collector of the hydrokinetic chamber
22 hydrokinetic chamber
23 hydroelectric generation equipment using a velocity-hydrokinetic generator turbine
24 hydrokinetic energy generation chamber
25 elevator providing access to the hydrokinetic energy generation chamber
26 leak channel of the hydrokinetic chamber
27 stop-log for maintenance of the hydrokinetic chamber
28 flow control gate of the hydrokinetic chamber Elements 1 to 20 are related to the configuration of an FHPP and the Energy-Generating Module (EGM), as explained at the state of the art; while Elements 21 to 28 represent optimizations of the composition of an FHPP for hydrokinetic energy generation, intended to increase the overall electric power of the plant. These elements are specifically linked to the Energy-Generating Module (EGM), as required by this invention.

Elements 14.1 and 14.3 to 14.10 are retained, as listed, and shown in detail in FIGS. 5 and 6 of PI 0301109-7. These elements and figures are not presented in this invention but are included here as references.

VI—DETAILED DESCRIPTION OF THE INVENTION

The Floating Hydroelectric Power Plant (FHPP) addressed by this invention constitutes a novel concept for low-head riverine hydroelectric power plants. With run-of-river operations and no need to regulate water flows, its overall energy is generated in its optimized penstocks section, meaning pressure/head hydroelectric power generation, with a bulb turbine 20, and through flow velocity with a hydrokinetic turbine 23. A cascading array of the Floating Hydroelectric Power Plant concept has described here in may constitute a hydroelectric complex suitable for medium to long head conditions.

The Floating Hydroelectric Power Plant (FHPP) addressed by this invention is comprised of a set of pillars 13, whose largest dimension is longitudinal to the watercourse. Floating modules (EGMs) are supported between these longitudinal pillars 13, within which specific spaces are embedded for hydroelectric power generation in the plant penstocks section. They are segregated by pressure/head energy generation in the powerhouse 17, and hydrokinetic energy generation in the hydrokinetic energy generation chamber 24. According to the technological concept, hydroelectric power generation is maximized in the powerhouse 17 during periods of medium to high water levels, with the hydrokinetic energy generation chamber 24, which must operate together, providing "hybrid" hydroelectric power generation.

At the FHPP, the flow/induced flow (pressure/head energy) is drawn in through openings in the bottom wall of the EGM 8, flowing into the floating modules through penstocks 7 and up to the powerhouse 17, where the pressure-driven energy generation equipment is located, specifically the bulb turbine 20.

When the entire flow of the watercourse is induced (during periods of medium to low water levels in the hydrological year), generating energy only through pressure in the bulb turbine 20 in the powerhouse 17, through the project head H, the module rests on a support apron of the EGM 9, located on the riverbed.

When there is excess water (medium high water season during the hydrological year), for a project head H, the modules begin to float. Under these operating conditions, energy generation through pressure occurs through the bulb turbine 20 in the powerhouse 17, driven by the induced flows and the head H, and part of the overflows ("spills") runs over the support apron 9 and under the bottom walls of the EGM 3, well another part of the overflows ("spills") is forced through the water collector 21 of the hydrokinetic chamber and then flows through the hydrokinetic chamber 22. This surplus flow runs through the hydrokinetic chamber 22 drives flow velocity energy generation (hydrokinetic energy) by an FHPP in the hydrokinetic energy generation chamber 24, where the hydrokinetic turbine generator 23 is located. Hence, there is no spillway at an FHPP.

The floating modules are called the Energy-Generating Modules (EGM). They generate all the energy of the plant throughout the hydrological year, both the pressure/head energy generated in the powerhouse 17 through the bulb turbine 20, and the hydrokinetic energy generated in the hydrokinetic energy generation chamber 24 through the hydrokinetic generator turbine 23, as mentioned above. The EGMs unsupported laterally between two consecutive longitudinal pillars 13, and may move along the support only in a vertical direction, seeking equilibrium for hydrodynamic thrust forces with their own weight and the tare weight of water added from the EGM pump house (not shown). By blocking the flow, the EGM generates a head H (drop) of a few meters between the upstream and downstream river water levels.

The electric power obtained from the pressure/head in the powerhouse 17 through the bulb turbine 20, at any season of the hydrological year, when the water is low, medium, or high, is generated as a function of this water level difference H and the induced flow (OTHC). As noted during experimental trials conducted on a small-scale model, the maximum head H of an FHPP is around eight meters, for safe operations without tilting or vibrations, with the project head H for FHPP operations in the range between two and eight meters. This produces a flow velocity in the penstocks section of an FHPP that varies from 6.3 to 12.5 m/s, while the maximum velocity of the flow obtained along natural river segments is around 1.5 m/s to 3.5 m/s. Another challenge (uncertainty) in the hydrokinetic energy generation area is to prospect for river stretches with this magnitude of natural speeds, as mentioned above.

An FHPP is conceptualized to work with a constant head H during most of its operations, regardless of whether it is run of river or induced flow (plant design load). The H design load (two to eight meters) is defined by environmental issues, whereby a small "reservoir" established for a hydroelectric complex will be limited to the maximum height of the river channel upstream from the penstocks section of the Plant, for any outflows throughout the hydrological year. Consequently, when the EGMs are floating, the total weight of the module must be altered by adding or removing tare weight. The tare weight of river water is stored in the lower level tanks of the EGM 5. It also changes automatically, in order to raise or lower the watercourse obstruction, whereby the project head H remains unchanged throughout the hydrological year.

Narrow side-dikes along the section of the river with the pillars 13, penstocks section of the Plant, force the entire flow between the pillars 13. These dikes may be made of soil, soil with stones, or concrete. In some cases, it may be foreseen that the dikes will overflow when the water is exceptionally high, especially if they are made of concrete.

Locks or shipping channels (not shown) may be located at the corner(s) of the penstocks section of the Plant, in order to handle or not interrupt the natural river movement of the watershed. The penstocks section of the Plant. may also include spaces (not shown) where floating materials pass through.

A hydroelectric facility generating hydraulic energy from a river may be a single stand-alone FHPP, or may be comprised of a cascading string of FHPPs. An FHPP can be installed on rivers of any size that meet the constant minimum flow requirements for pressure/head energy generation. Depending on the watershed area and the run of river flow, an FHPP can operate as a small or large hydroelectric power plant.

The more regular the hydrological regime of the watercourse (flow regime), the higher the efficiency for generating hydraulic pressure energy with a bulb turbine (20) in an FHPP. Hence, there is an advantage in having river flow regulation structures upstream, such as a conventional hydroelectric power plant upstream with a regulation reservoir. In this case, the operating efficiency of the FHPPs for generating hydroelectric power through pressure with a bulb turbine 20 is maximized.

For generating hydrokinetic energy in the hydrokinetic turbine 23, the flow velocity is a function of the project head H in the penstocks section of an FHPP, as mentioned above. As an FHPP operates with a constant head H (design head) throughout the hydrological year, the hydrological regime (flow regime) has no influence on the hydrokinetic energy generation of an FHPP.

The following examples are thus samples of situations that are more feasible for an FHPP:

River stretches downstream from outflow regulation dams.

River stretches with low heads, integrated into a cascading string of conventional hydroelectric power plants.

Watercourses with high concentrations of solid outflows and/or good fishing potential and/or heavy pollution loads.

Watercourses with inland shipping potential, where a cascading string of FHPPs might provide an additional benefit of navigability.

Watercourses in regions with significant development, with low water heads available for hydroelectric generation purposes, and where high land prices make a storage reservoir or forebay impractical for a conventional plant. This situation is common in coastal basins and/or densely populated valleys. A cascade of FHPPs may be built in such regions, responding to local demands from cities and industries.

Watercourses in environmentally frail valleys, such as some parts of the Amazon Basin.

Watercourses with high water output, endowing the energy generated by an FHPP with a keener competitive edge.

There are thus several possibilities that, whether combined or not, make the implementation of a stand-alone FHPP attractive, or implementing a plan that integrates FHPPs or strings of FHPPs with conventional hydroelectric power plants.

Moreover, it must be emphasized that, due to their modular nature, construction schedules and full generation start-up dates for an FHPP are generally much shorter than those of a conventional hydroelectric power plant requiring a dam. Consequently, investments in FHPPs offer faster financial and social returns.

VII—IMPROVEMENTS INTRODUCED

The main technological development introduced through the present invention lies in the details of the Energy-Generating Module EGM.

Figure 2:
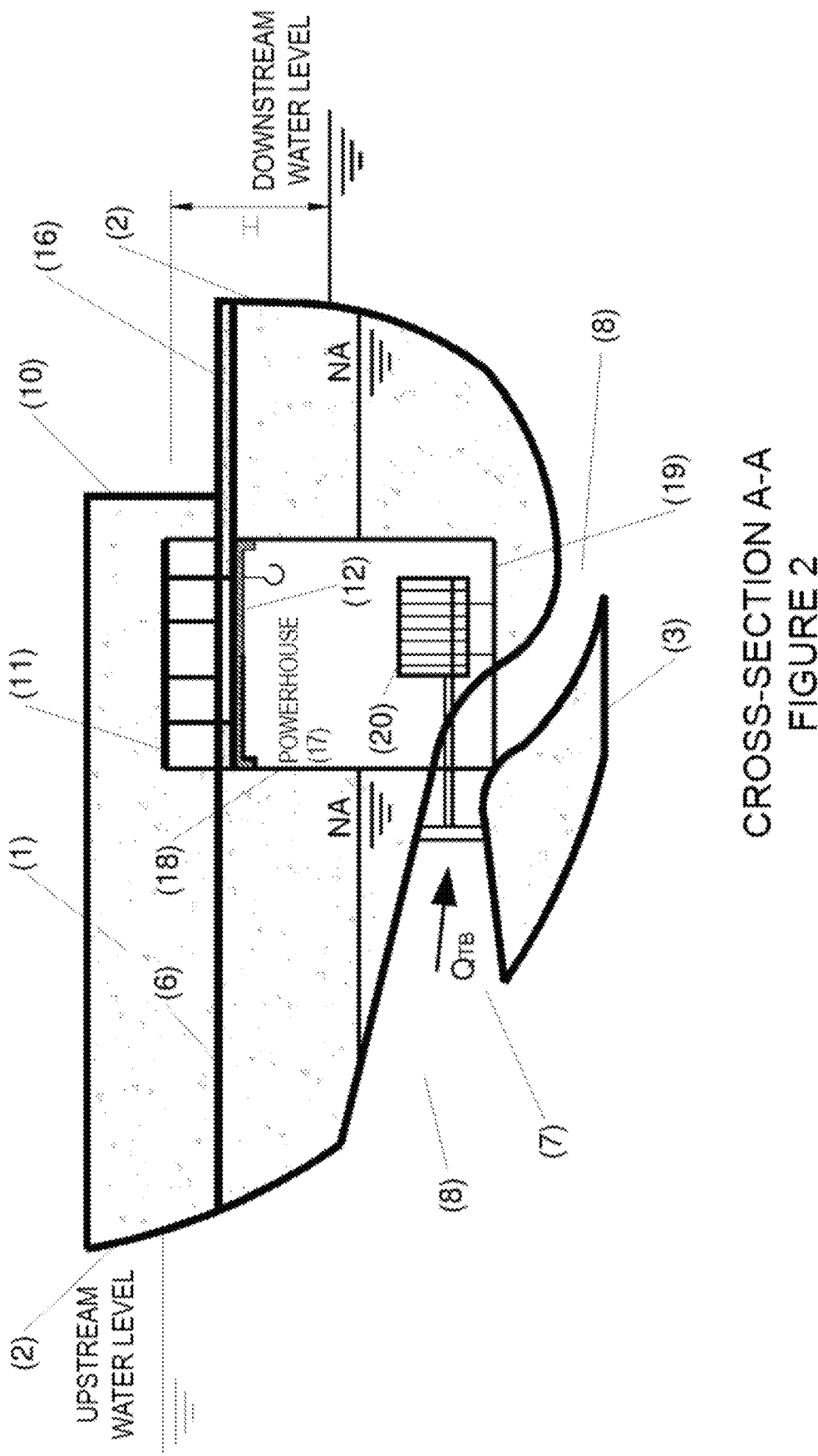
FIG. 2 shows a cross-section view of FIG. 1.
Figure 3:
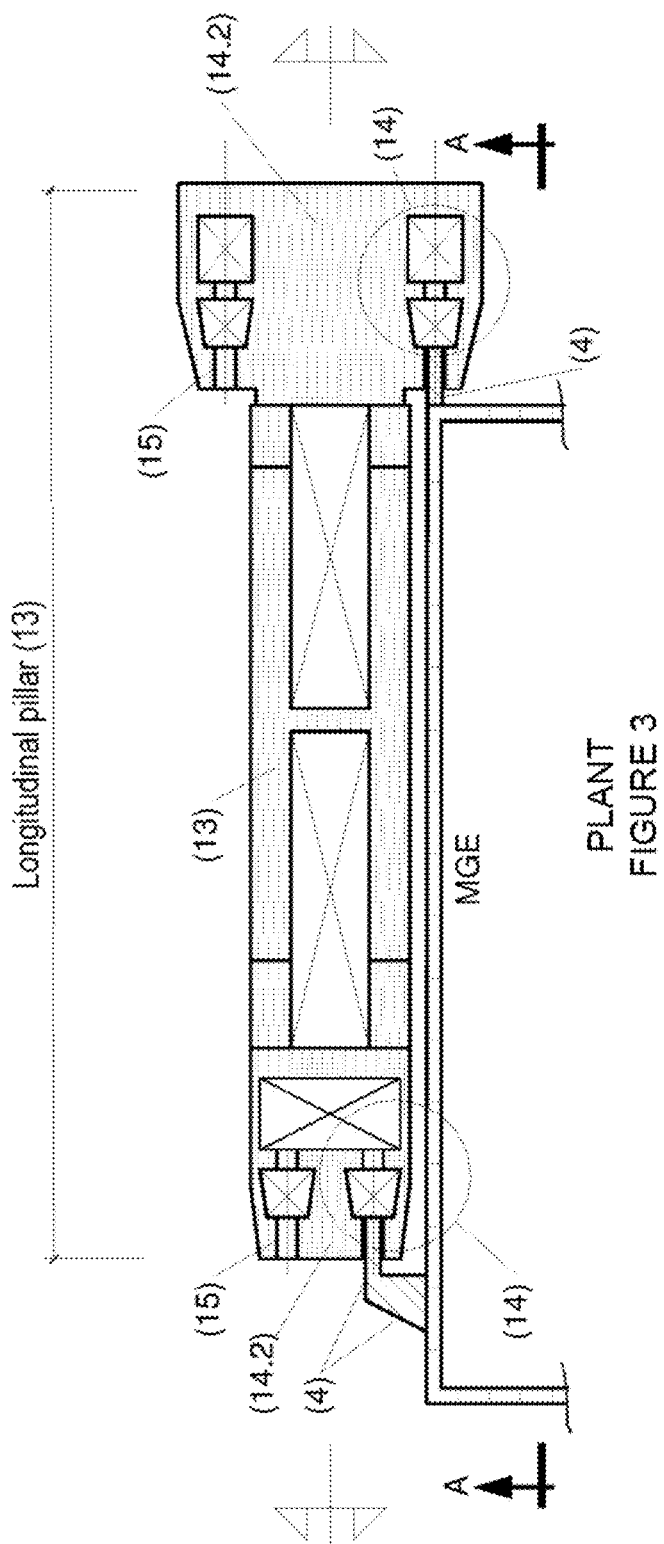
FIG. 3 shows a non-detailed floorplan of the support guide system and vertical displacement of the Energy-Generating Module between the longitudinal pillars.
Figure 4:
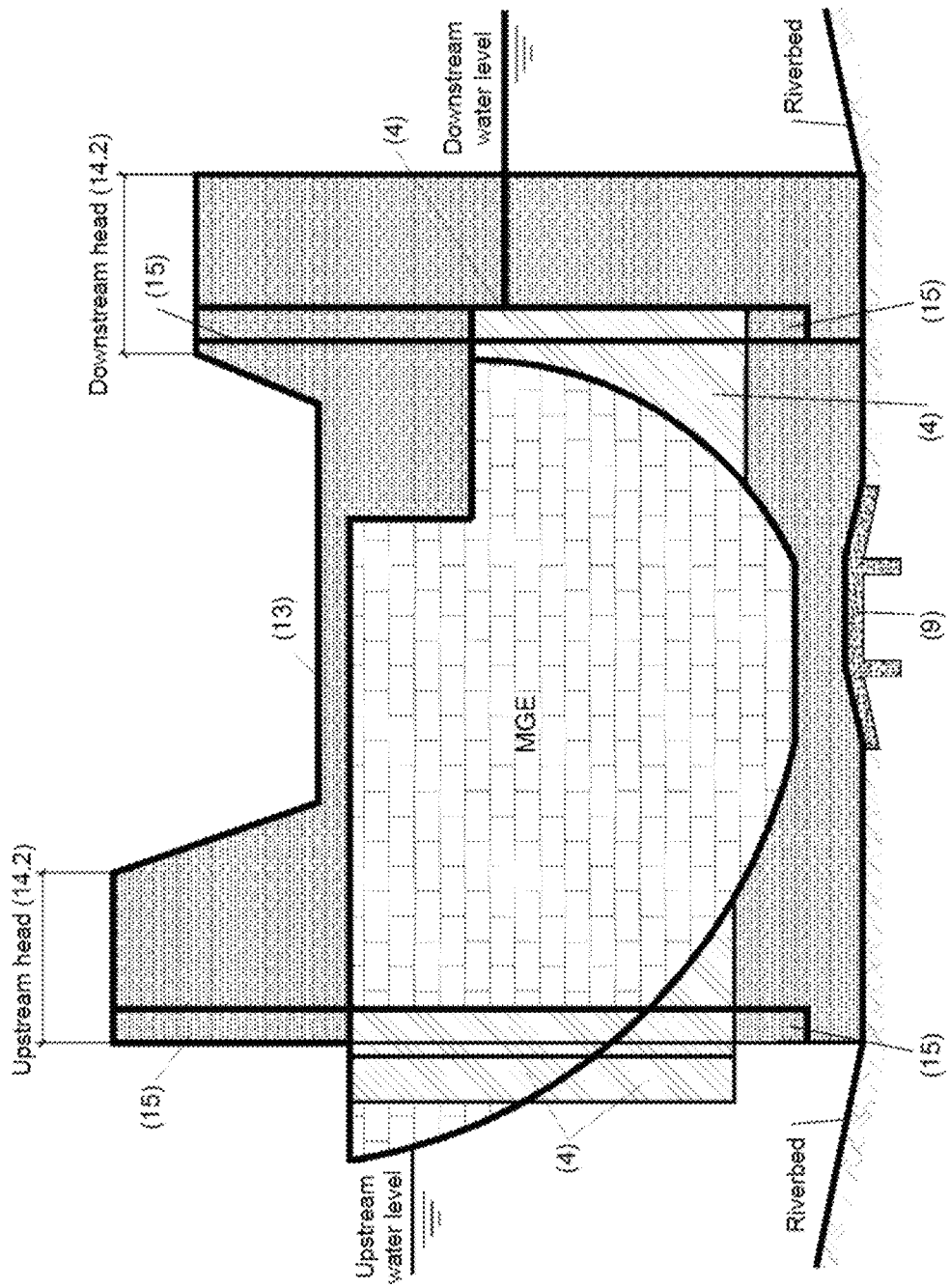
FIG. 4 shows a cross-section view of FIG. 3.

FIGS. 1 and 2 are presented as EGM configurations and elements at the state of the art, as represented by PI 0301109-7.

The Energy-Generating Module EGM addressed by this invention goes beyond that presented in PI 0301109-7 (FIGS. 1 and 2) and introduces its own elements (FIGS. 5 to 7), thus disclosing a unit that generates energy, defined by this invention as a novel conceptualization for floating hydroelectric power plants.

An improvement introduced by the present invention is the optimization of the internal spaces of the EGM for hydrokinetic energy generation (FIGS. 5 to 7), as described below. The floating hull of the EGM may be made of steel, concrete, or reinforced plastic. Its hydrodynamic profile was obtained through experiments conducted in a small-scale experimental two-dimensional hydraulic laboratory at a 1:50 scale. These experiments allowed the identification of a "hull profile" with hydrodynamic stability and floatability conditions suitable for maximizing river heads H, and generating hydro energy through pressure/head in the bulb turbine 20. According to the state of the art, its vertical dimensions must be compatible with the elevation selected for the top of the bottom lining apron 9, based on the hydrodynamic floatability characteristics of the proposed profile, as well as the flow regime and water levels of the watercourse. On the other hand, its horizontal dimensions depend primarily on the size and quantity of turbine generators 20 in each EGM, which are selected according to hydro energy studies, electro-mechanical equipment, and hydro-mechanical aspects of pressure/head energy generation.

Comparing FIGS. 1 and 2 illustrating the EGM in the prior art, with FIGS. 5 to 7 presenting the EGM addressed by this invention, an increase is noted in the spaces of the hydrokinetic energy generation elements in the EGM, namely elements 21 to 28 in FIGS. 5 to 7, thus allowing the optimization of overall hydroelectric power generation by the EGM of an FHPP, in addition to energy generation through pressure/head in the prior art.

The improvements to the EGM introduced by this invention, as shown in FIGS. 5 to 7 and listed in elements 21 to 28, are described below, according to the System (a) "of the forced flows/velocities", and System (b) "of the hydrokinetic energy generation unit flow".

The support guide system is retained, as well as the vertical displacement of the generation modules (EGM) between the longitudinal pillars 13, shown in FIGS. 5 and 6 at the previous state of the art, together with the ballast water variation operating system of the generation modules, already encompassed by the prior art.

With regard to the System (a) "of the outflow of the induced-forced flows/velocities", during the medium-high water periods of the hydrological year, in the penstocks section of an FHPP, the EGM, which operates according to a Project drop/head H, the water collector 21 of the hydrokinetic chamber, located in and altimetrically on the bottom of the EGM, on the upstream side of this EGM, draws in part of the overflows "spills" QTHC, and the other part flows out under the bottom walls of the EGM 3 and over the support apron of the EGM 9. This flow QTHC drawn into the water collector 21 of the hydrokinetic chamber is forced through the length of the hydrokinetic chamber 22, which occupies the entire longitudinal length of the EGM and is located in of the EGM and altimetrically very close to the bottom wall of the EGM 3, the hydrokinetic chamber 22 discharges flows drawn in by the water collector 21 of the hydrokinetic chamber and transmits the outflows and velocities to its final segment, constituted by the leak channel 26 of the hydrokinetic chamber located on the bottom 3 and on the downstream side of the EGM. The cross section of the hydrokinetic chamber 22 will be circular, ensuring the feasibility of providing maximum hydraulic efficiency, with a diameter compatible with that of the propeller/vanes of the hydrokinetic generator turbine 23. Monitoring/control of the flows/velocities drawn into the water collector 21 of the hydrokinetic chamber and discharged into the hydrokinetic chamber 22 is handled by the control gate 28 of the flow in the hydrokinetic chamber, which is located upstream, as close as possible to the hydrokinetic energy generation chamber 24, whereby the control gate 28 does not influence the flow velocity in the hydrokinetic chamber 22, with the hydrokinetic energy generation chamber 24 planimetrically located downstream from the control gate 28. Maintenance/repairs of the hydrokinetic chamber 22 and its control gate 28 is handled by blocking the entrance (upstream) and exit (downstream) of the flow in the hydrokinetic chamber 22, from the stop-logs 27 for the maintenance of the hydrokinetic chamber 27, located at the start (upstream) and end (downstream) of the hydrokinetic chamber 22. In the EGM, the said System (a) is sized/planned for placement planimetrically between 1 (one) pair of hydroelectric power generation through pressure/head H components, comprised of the powerhouse 17 and the bulb turbine 20. Consequently, the floorplan layout of the EGM, as simulated in FIG. 5, with 4 (four) powerhouses 17 and their corresponding bulb turbines 20, has 3 (three) System (a) sets.

With regard to the "hydrokinetic energy generation flow" System (b), which is composed of the hydrokinetic energy generation chamber 24, is planimetrically located about halfway along the longitudinal length of the EGM and upstream from the cross-walls of the powerhouse 18 of the pressure power generation facility, and altimetrically located on the bottom of the EGM, immediately above the hydrokinetic chamber 22. The dimensions of the hydrokinetic energy generation chamber 24 must be suitable for housing the hydrokinetic generator turbine 23, as well as performing maintenance and repair services in the hydrokinetic generator turbine 23 and on the flow control gate of the hydrokinetic chamber 28. It must also house a set of motor-pumps (not shown) to empty the hydrokinetic chamber 22 for maintenance of the hydrokinetic chamber 22. As mentioned, the hydrokinetic energy generation chamber 24 includes the hydrokinetic generator turbine 23, with head Y in terms of the pressure turbine (bulb) 20 (FIG. 7). The hydrokinetic energy generation chamber 24 occupies the entire cross-width of the EGM, being supported by the two side-walls of the EGM 1. The planimetric location of the hydrokinetic generator turbine 23 for generating hydroelectricity corresponds to about half the length of the hydrokinetic chamber 22. The propellers/vanes of the turbine 23, which must be submersed in the hydrokinetic chamber 22, are connected to the electricity generator by the turbine rotor (not shown), which is located in the hydrokinetic energy generation chamber 24. The vanes-propellers of the hydrokinetic generator turbine 23, submersed in the hydrokinetic chamber 22, as mentioned, transform the hydraulic energy (hydrokinetic energy) of the inflow/flow/velocities of water drawn into the water collector 21 of the hydrokinetic chamber and flowing out through the hydrokinetic chamber 22, into mechanical energy through the torque and rotation velocity of the vanes/propellers 23, which is transmitted to a rotor coupled to a power generator (not shown) and located in the hydrokinetic energy generation chamber 24, for generating electricity in the said chamber 24, with the flow velocity in the hydrokinetic chamber 22 being a direct function of the project drop/head H. This may reach values of 6.3 to 12.5 m/s respectively for the project head H, varying from two to eight meters in the penstocks section of an FHPP, while natural maximum velocities in watercourses are between 1.5 and 3.5 m/s. The electrical power generated in the blades/propellers 23 is a power type mathematical equation with increasing concavity, a flow velocity function, namely: P=f (V) In other words, the higher the heads H, the higher the flow velocities in the hydrokinetic chamber 22, whereby more electrical power is generated by an FHPP in its penstocks section by velocity in hydrokinetic turbine generator 23 hydroelectric generation equipment, located in the hydrokinetic energy generation chamber 24. in the hydrokinetic energy generation chamber 24. Maintenance and repair of the hydrokinetic turbine generator 24 and the control gates 28 will be performed, with its space being compatible with the ergonomics of such functions, whereby overhead cranes, and the necessary equipment (not shown) will be available in this hydrokinetic energy generation chamber 24 as by such services. The hydrokinetic energy generation chamber 24 is accessed by an elevator 25 that provides access to the hydrokinetic energy generation chamber, located at one end of the EGM and planimetrically connected to the hydrokinetic energy generation chamber 24, whereby the elevator 25 EGM surface to the hydrokinetic energy generation chamber 24 area, with the latter located close to the hydrokinetic chamber 22 and the bottom 3 of the EGM.

The Specification of this invention is not limiting, merely exemplifying the possibilities allowed by the invention presented herein, as understood by a person versed in the art.

The invention claimed is:

1. A hydrokinetic chamber (22), characterized in that the hydrokinetic chamber comprises a circular cross section, with a diameter compatible with that of a propeller/vanes of a hydrokinetic turbine (23), with the hydrokinetic chamber (22) located in and altimetrically on a bottom of an Energy-Generating Module (EGM), adjacent to a bottom wall of the EGM (3), occupying an entire longitudinal length of the EGM, and planimetrically located in a space between 1 (one) pair of pressure/head hydropower generation components including a powerhouse (17) and a bulb turbine (20), wherein the hydrokinetic chamber (22) comprises:

a water collector of the hydrokinetic chamber (21), located in and altimetrically on the bottom (3) of the EGM, on an upstream side of the EGM;

a leak channel of the hydrokinetic chamber (26), located on the bottom of the EGM and on a downstream side of the EGM;

a flow control gate of the hydrokinetic chamber (28), upstream from a hydrokinetic energy generation chamber (24); and first and second stop-logs for maintenance of the hydrokinetic chamber (27), the first stop-log being located at an upstream end, and the second stop-log being located at a downstream end relative to the hydrokinetic chamber (22).

2. A hydrokinetic energy generation chamber (24), characterized in that the hydrokinetic energy generation chamber (24) is located planimetrically about halfway along a longitudinal length of an Energy-Generating Module (EGM) and upstream from cross-walls (18) of a powerhouse (17) of a pressure power generation facility, and altimetrically immediately above a hydrokinetic chamber (22) on a bottom of the EGM, with dimensions of the hydrokinetic energy generation chamber (24) being compatible with housing a hydrokinetic turbine (23) and motor pumps, with equipment and space needed to perform repairs and maintenance thereon.

3. The hydrokinetic energy generation chamber (24), according to claim 2, characterized in that the hydrokinetic energy generation chamber occupies an entire cross-width of the EGM, with the hydrokinetic energy generation chamber (24) being supported by two side-walls of the EGM (1).

4. The hydrokinetic energy generation chamber (24), according to claim 2, characterized in that the hydrokinetic energy generation chamber (24) is fitted with an elevator (25) providing access to the hydrokinetic energy generation chamber (24), wherein the elevator (25) is located at one end of the EGM and planimetrically connected to the hydrokinetic energy generation chamber (24), with the elevator (25) connecting an EGM upper surface to an area of the hydrokinetic energy generation chamber (24), with the hydrokinetic energy generation chamber (24) being located above and adjacent to the hydrokinetic chamber (22) and a bottom (3) of the EGM.

5. An energy generation method, characterized in that at least one hydrokinetic chamber (22), as defined in claim 1 discharges flows and transmits velocities (QTHC) of water flows drawn into the water collector of the hydrokinetic chamber (21) to the propeller/vanes of the hydrokinetic turbine (23), submersed in the hydrokinetic chamber (22), which transforms hydraulic energy and/or kinetic energy into mechanical energy through torque and rotation velocity of the propeller/vanes of the hydrokinetic turbine (23), which is sent to a rotor coupled to an energy generator to generate electric power in the hydrokinetic energy generation chamber (24), with an outflow velocity in the hydrokinetic chamber (22) being a direct function of a project drop/head H.

6. The energy generation method, as defined in claim 5, wherein the method generates hybrid energy through pressure and velocity, characterized in that the hydrokinetic energy generation chamber (24) generates hydrokinetic energy of the EGM from the propeller/vanes of the hydrokinetic turbine (23), which are submersed in the hydrokinetic chamber (22), connected to the energy generator by the rotor, wherein the energy generator is located in the hydrokinetic energy generation chamber (24), wherein the hydrokinetic energy generation chamber (24) is located planimetrically about halfway along a longitudinal length of the EGM and upstream from cross-walls (18) of the powerhouse (17) of a pressure power generation facility, and altimetrically immediately above the hydrokinetic chamber (22), with dimensions of the hydrokinetic energy generation chamber (24) being compatible with housing the hydrokinetic turbine (23) and associated motor pumps, and with equipment and space needed to perform repairs and maintenance thereon, wherein the hydrokinetic energy generation chamber (24) occupies an entire cross-width of the EGM, with the hydrokinetic energy generation chamber (24) supported by two side-walls of the EGM (1).

7. The energy generation method according to claim 6, characterized in that the hybrid energy is generated simultaneously by pressure and velocity.

8. An energy generation method, characterized in that the hydrokinetic energy generation chamber (24), as defined in claim 3, generates hydrokinetic energy of the EGM from propeller/vanes of the hydrokinetic turbine (23), which are submersed in the hydrokinetic chamber (22), connected to a generator by a turbine rotor, wherein the generator is located in the hydrokinetic energy generation chamber (24).

9. An energy-Generating Module (EGM), characterized in that the EGM comprises the combination of the hydrokinetic chamber (22), as defined in claim 1, and the hydrokinetic energy generation chamber (24), characterized in that the hydrokinetic energy generation chamber is located planimetrically about halfway along a longitudinal length of the EGM and upstream from cross-walls (18) of the powerhouse (17), and altimetrically immediately above the hydrokinetic chamber (22), wherein the hydrokinetic chamber (22) is on the bottom of the EGM, with dimensions of the hydrokinetic energy generation chamber (24) being compatible with housing the hydrokinetic turbine (23) and motor pumps, and with equipment and space needed to perform repairs and maintenance thereon.

10. A Floating Hydroelectric Power Plant (FHPP), characterized in that it comprises:
(i) at least one hydrokinetic chamber (22), as defined in claim 1,
(ii) the hydrokinetic energy generation chamber (24), characterized in that the hydrokinetic energy generation chamber is located planimetrically about halfway along a longitudinal length of the Energy-Generating Module (EGM) and upstream from cross-walls (18) of a powerhouse (17), and altimetrically immediately above the hydrokinetic chamber (22), wherein the hydrokinetic chamber (22) is on a bottom of the EGM, with dimensions of the hydrokinetic energy generation chamber (24) being compatible with housing a hydrokinetic turbine (23) and motor pumps, with equipment and space needed to perform repairs and maintenance thereon, and
(iii) the Energy-Generating Module (EGM), characterized in that the EGM module generates hybrid hydroelectricity, comprising energy generation (i) through pressure in the cross-walls (18) of the powerhouse and a bulb turbine (20), and (ii) hydroelectricity generation through flow speed in the hydrokinetic energy generation chamber (24) and the hydrokinetic turbine (23), simultaneously.

* * * * *